United States Patent [19]

Ducasse

[11] 4,074,751

[45] Feb. 21, 1978

[54] MULTIFLOW ROTARY HEAT EXCHANGER ELEMENT

[75] Inventor: Joseph Christophe Victor Ducasse, Martinez, Calif.

[73] Assignee: Unice Machine Company, San Francisco, Calif.

[21] Appl. No.: 663,224

[22] Filed: Mar. 3, 1976

Related U.S. Application Data

[63] Continuation of Ser. No. 518,163, Oct. 25, 1974, abandoned.

[51] Int. Cl.$^2$ ............................................. F28F 5/04
[52] U.S. Cl. ................................. 165/92; 159/25 R; 127/16
[58] Field of Search ............... 165/92, 170; 159/25 R; 127/15, 16

[56] References Cited

U.S. PATENT DOCUMENTS

| | | | |
|---|---|---|---|
| 2,453,718 | 11/1948 | Mason et al. ........................... | 165/92 |
| 2,458,440 | 1/1949 | Stafford ............................. | 165/92 X |
| 2,594,142 | 4/1952 | Feldstein et al. ....................... | 165/92 |
| 2,650,175 | 8/1953 | Rodriquez ........................... | 165/92 X |
| 3,130,080 | 4/1964 | Berger ..................... | 127/15 |
| 3,762,947 | 10/1973 | Ornstein et al. ....................... | 127/15 |
| 3,882,934 | 5/1975 | Knoos et al. ......................... | 165/170 |

FOREIGN PATENT DOCUMENTS

| | | | |
|---|---|---|---|
| 2,260,820 | 6/1973 | Germany ............................... | 165/92 |
| 20,777 of | 1903 | United Kingdom .............. | 159/25 R |

Primary Examiner—Charles J. Myhre
Assistant Examiner—Theophil W. Streule, Jr.
Attorney, Agent, or Firm—Wenderoth, Lind & Ponack

[57] ABSTRACT

A multiflow rotary heat exchanger element of the type normally used for the continuous processing of various materials through heating, cooling and stirring includes a shaft arranged to rotate within a container and having on its periphery a plurality of planar coil sets, each formed of a number of individual tubular coils. The coils are interconnected to form separate plural conduits, through each of which a fluid passes continuously and simultaneously. The arrangement is such that, during operation, the temperature of a material being processed is uniform in any plane transverse to the container, but uniformly and progressively altered longitudinally of the container.

15 Claims, 2 Drawing Figures

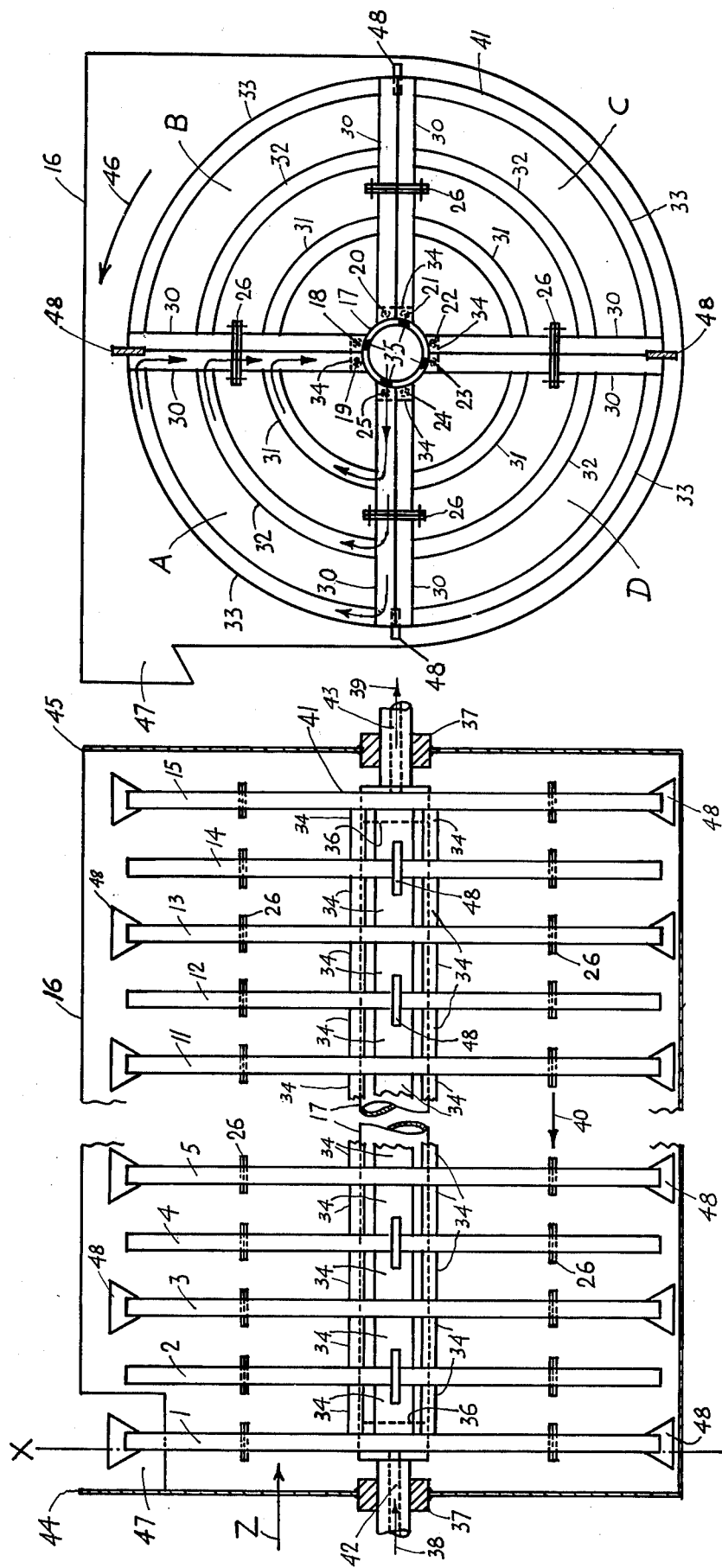
FIG. I
FIG. II

MULTIFLOW ROTARY HEAT EXCHANGER ELEMENT

This is a continuation of application Ser. No. 518,163, filed Oct. 25, 1974, now abandoned.

BACKGROUND OF THE INVENTION

Field of the Invention

The present invention relates to a multiflow rotary heat exchanger element for the continuous processing of various materials through heating, cooling and stirring, notably of the type which is normally used in the continuous crystallization processing of so-called sugar massecuites.

Prior Art

It is well known that the crystallization processing of sugar massecuites is very delicate and requires good temperature control throughout in order to prevent formation of false grains, while allowing a progressive and uniform growth of the sugar crystals. In a continuous process, this is only possible if a progressive and uniform fall of the massecuite temperature is maintained along the length of the crystallizer during the cooling period, a condition that requires the cooling fluid to circulate in a direction opposite to that of the massecuite in order to take maximum advantage of countercurrent action.

Hitherto, quite a number of different types of heat exchangers have been used in the crystallization processing of sugar massecuites. The preferred design, so far, has been of the type which is intended for continuous operation and in which the hot massecuite enters at one end to leave at the other, while the cooling fluid (usually water) circulates through a number of hollow disks mounted on a rotating shaft in a direction somewhat opposite to that of the massecuite.

However, these known devices, while adequate in some respects, do not provide for a uniform alteration of the massecuite temperature across their coils or disks. This drawback is due to the fact that the cooling water circulates through each coil or disk either from the center to the periphery or vice versa, resulting in a difference of the temperature of the cooling water therein and, accordingly, a difference in the massecuite temperature. It is true, however, that the stirring action of the rotating element tends to minimize these bad effects.

Another disadvantage associated with these known devices is the generally sophisticated arrangement of the rotating elements, which results in great difficulties during repair.

SUMMARY OF THE INVENTION

An object of the invention is to provide an improved rotary heat exchanger element having separate conduits for simultaneous multiflow countercurrent action during continuous operation.

A particular object of the invention is to provide such an element which will achieve a substantially uniform temperature of the material being processed across any section perpendicular to the direction of flow thereof.

A further object of the invention is to provide such an element which will achieve a substantially uniform and progressive alteration of the material temperature, in the direction of flow of the material, throughout the entire process.

Another object of the invention is to provide such an element which will afford a relatively high heat transfer surface, while being easily detachable for access during repair.

DESCRIPTION OF THE DRAWINGS

In the accompanying drawings,

FIG. I is an elevation showing part of a heat exchanger element of the type described arranged within a container.

FIG. II is a cross section along line XX and looking in direction of arrow Z in FIG. 1.

DESCRIPTION OF THE PREFERRED EMBODIMENT

Referring to the accompanying drawings which form a part of this disclosure, a heat exchanger element 41 is shown arranged within a container 16 and supported by means of bearings 37. Element 41 comprises a hollow shaft 17 along the periphery of which are similarly and rigidly mounted, substantially perpendicular to the axis of shaft 17, a series of coil sets 1 to 15. Each coil set comprises four identical and separate coils, preferably formed of square tubing, and each arranged to form a circular sector A, B, C or D as shown. The four coils of each set are positioned in circumferentially abutting relationship to form each respective set. Each set is entirely positioned in a plane transverse to the longitudinal axis of shaft 17. Each coil comprises two hollow radial arms 30 interconnected by means of concentric ring portions 31, 32 and 33.

Henceforth, and for the purpose of clarity, each coil will be referred to as A1, B1 etc., meaning the coil of set 1 positioned in sector A, the coil of set 1 positioned in sector B, etc.

The coils of each set 1 to 15 are connected so as to form four similar but separate fluid conduits extending the entire length of the device, and the following describes the manner in which the conduit through coil A1 is formed. Starting with coil A1, one end of one of the radial arms 30 thereof is connected to shaft 17 through hole 35. Fluid flows radially outwardly through this radial arm 30, circumferentially through respective ring portions 31, 32 and 33, and radially inwardly through the other radial arm 30 of coil A1, which is connected to one end of one radial arm 30 of coil B2 through hole 19 in coil A1 via channel 34 and hole 18 in coil B2. Coil B2, in turn, is similarly connected to coil C3 through hole 20 in coil B2 via channel 34 and hole 21 in coil C3. Coil C3 is similarly connected to coil D4 through hole 22 of coil C3 via channel 34 and hole 23 of coil D4. Coil D4 is similarly connected to coil A5 through hole 24 of coil D4 via channel 34 and hole 25 of coil A5, and so on, until the fluid conduit reaches the last coil, in this case C15, which is similarly connected to the interior of shaft 17. The other fluid conduits extending through coils B1, C1 and D1 are connected in a similar manner. The space inside shaft 17 included between the two end sets 1 and 15 is sealed by means of plates 36. Shaft 17 is coupled to a motor and conveniently equipped with means to allow for the continuous flow of a fluid through the conduits.

Assuming that sugar massecuite is to be processed for crystal growth through stirring and cooling by water, the following describes the principle of operation of the device. Rotation of shaft 17 is started in the direction of arrow 46, and cold water is allowed to flow continuously via channel 42 in the direction of arrow 38 simultaneously into all four fluid conduits, and out through channel 43 in the direction of arrow 39. Hot massecuite is fed continuously at end 45 of container 16 and travels in the direction of arrow 40, across the rotating coils, to eventually overflow through channel 47 conveniently located at the other end 44 of the container 16. Cooling of the massecuite is meanwhile effected, thus causing supersaturation of the mother liquor and, eventually, growth of the crystals contained in the massecuite. It is necessary, however, that this growth be progressive and at a rate which will prevent false grain formation. In other words, it is necessary that the massecuite be cooled down progressively and uniformly along the length of the container. Obviously, this condition calls for good countercurrent action in order to assure that the hot massecuite will always be in contact only with coils which are relatively warm, and vice versa.

In the embodiment illustrated, this condition is fulfilled in a very efficient manner in that the cooling water flows under the same conditions, in the same direction (as indicated by the arrows on coil A1 in FIG. II) and simultaneously in each coil. It is to be noted that the flow of water through the concentric rings 31, 32 and 33 of each coil is also countercurrent to the direction of rotation of the element and therefore to the direction in which the massecuite is displaced by the coils. Consequently, the respective temperature of the water in the coils of each set of coils is substantially uniform, while however the temperature of the water progressively increases from set 1 to 15. Accordingly, the respective temperature of each massecuite layer lying in a plane perpendicular to the axis of container 16 is similarly uniform while also increasing from end 44 to end 45 of container 16.

Each set of coils has a pair of paddles 48 attached to its periphery to promote stirring of the material being processed. Further, each set of coils is made detachable by means of flanges 26 bolted together for easy access during repair.

While there has been shown and described a preferred embodiment of the invention, it is to be distinctly understood that the invention is not limited thereto but may be otherwise embodied within the scope of the following claims. For example, arrangements could be made for supplying hot water to part only of the coils for reheating purposes when required.

What is claimed is:

1. A multiflow rotary heat exchanger element comprising:
    a rotatably mounted longitudinal shaft;
    a plurality of coil sets fixedly positioned to said shaft at spaced intervals along the length thereof;
    each of said coil sets being formed of an equal plurality of separate equally configured coils, each of said coils of each set being in the form of a circular sector, each of said coils having extending therethrough a fluid passage including first and second radial portions joining at least one circumferential portion, all of said coils of each said coil set being arranged substantially in a plane transverse to the longitudinal axis of said shaft;
    a plurality, equal to said plurality of coils in each said coil set, of separate fluid conduit means for supplying plural separate streams of fluid from a first end of said element to a second end thereof, said fluid conduit means being entirely fluid isolated from each other;
    each said fluid conduit means including the fluid passage of a selected one only of said coils of each of said coils sets, and a plurality of separate channels, one each of said channels connecting the fluid passage of the said selected coil of one of said coil sets with the fluid passage of the said selected coil of the next successive coil set, said channels serially connecting said fluid passages of said selected coils from said first end of said element to said second end thereof;
    fluid inlet means extending into a first end of said shaft, said fluid inlet means communicating with the first radial portion of each of said fluid passages of the coils of the coil set adjacent said first end of said shaft;
    fluid outlet means extending from a second end of said shaft, said fluid outlet means communicating with the second radial portion of each of said fluid passages of the coils of the coil set adjacent said second end of said shaft;
    the separate channels of each of said separate fluid conduits connecting the second radial portion of the fluid passage of the respective selected coil of each coil set with the first radial portion of the fluid passage of the respective selected coil of the next downstream coil set, taken in the direction of flow of fluid from said first end of said shaft to said second end thereof; and
    said coils in the form of circular sectors being positioned such that corresponding sectors of each of said coil sets are aligned longitudinally of said shaft, the adjacent selected and connected coils of each of said separate fluid conduits being sequentially circumferentially displaced with respect to each other, and the circumferential displacement of said selected and connected coils being in a direction opposite to the direction of rotation of said shaft.

2. An element as claimed in claim 1, wherein said coils of each said coil set are positioned in circumferentially abutting relation.

3. An element as claimed in claim 1, wherein said fluid passage of each said coil includes plural circumferential portions.

4. An element as claimed in claim 1, wherein said shaft is hollow, said separate channels are positioned exteriorly of said shaft, and the interior of said shaft is sealed between said inlet means and said outlet means.

5. An element as claimed in claim 1, wherein fluid flow through all of said circumferential portions of each of said fluid passages is opposite to the direction of rotation of said shaft.

6. An element as claimed in claim 1, wherein each of said coil sets is formed of four separate coils, and said plurality of separate fluid conduits equals four separate fluid conduits.

7. An element as claimed in claim 1, further comprising stirring blades attached to peripheral portions of each of said coil sets.

8. An apparatus for the continuous heat treatment and stirring of a material, said apparatus comprising:
    a material container;
    a material inlet at a first end of said container for continuously introducing therein material to be treated;
    a material outlet at a second opposite end of said container for continuously removing therefrom treated material;

a shaft rotatably mounted in said first and second container ends and extending longitudinally through said container;

a plurality of coil sets fixedly positioned to said shaft at spaced intervals along the length thereof;

each of said coil sets being formed of an equal plurality of separate equally configured coils, each of said coils of each set being in the form of a circular sector, each of said coils having extending therethrough a fluid passage including first and second radial portions joining at least one circumferential portion, all of said coils of each said coil set being arranged substantially in a plane transverse to the longitudinal axis of said shaft;

a plurality, equal to said plurality of coils in each coil set, of separate fluid conduit means for supplying plural separate streams of fluid from a first end of said shaft to a second end thereof, said fluid conduit means being entirely fluid isolated from each other;

each said fluid conduit means including the fluid passage of a selected one only of said coils of each of said coil sets, and a plurality of separate channels, one each of said channels connecting the fluid passage of the said selected coil of one of said coil sets with the fluid passage of the said selected coil of the next successive coil set, said channels serially connecting said fluid passages of said selected coils from said first end of said shaft to said second end thereof;

fluid inlet means extending into said first end of said shaft, said fluid inlet means communicating with the first radial portion of each of said fluid passages of the coils of the coil set adjacent said first end of said shaft;

fluid outlet means extending from said second end of said shaft, said fluid outlet means communicating with the second radial portion of each of said fluid passages of the coils of the coil set adjacent said second end of said shaft;

the separate channels of each of said separate fluid conduits connecting the second radial portion of the fluid passage of the respective selected coil of each coil set with the first radial portion of the fluid passage of the respective selected coil of the next downstream coil set, taken in the direction of flow of fluid from said first end of said shaft to said second end thereof; and said coils in the form of circular sectors being positioned such that corresponding sectors of each of said coil sets are aligned longitudinally of said shaft, the adjacent selected and connected coils of each of said separate fluid conduits being sequentially circumferentially displaced with respect to each other, and the circumferential displacement of said selected and connected coils being in a direction opposite to the direction of rotation of said shaft.

9. An apparatus as claimed in claim 8, wherein said coils of each said coil set are positioned in circumferentially abutting relation.

10. An apparatus as claimed in claim 8, wherein said fluid passage of each said coil includes plural circumferential portions.

11. An apparatus as claimed in claim 8, wherein said shaft is hollow, said separate channels are positioned exteriorly of said shaft, and the interior of said shaft is sealed between said inlet means and said outlet means.

12. An apparatus as claimed in claim 8, wherein fluid flow through all of said circumferential portions of each of said fluid passages is opposite to the direction of rotation of said shaft.

13. An apparatus as claimed in claim 8, wherein each of said coil sets is formed of four separate coils, and said plurality of separate fluid conduits equals four separate fluid conduits.

14. An apparatus as claimed in claim 8, further comprising stirring blades attached to peripheral portions of each of said coil sets.

15. An apparatus as claimed in claim 8, wherein said apparatus comprises a crystallization device for achieving the progressive and uniform growth of sugar crystals from sugar massecuite, said material to be treated comprises sugar massecuite, and said fluid comprises cooling water.

* * * * *